United States Patent [19]
Janik et al.

[11] Patent Number: 5,236,579
[45] Date of Patent: Aug. 17, 1993

[54] FUEL FILTER ASSEMBLY WITH MODULAR DRAIN BOWL

[75] Inventors: Leon P. Janik, Suffield; Stephen F. Burgess, Higganum, both of Conn.

[73] Assignee: Stanadyne Automotive Corp., Windsor, Conn.

[21] Appl. No.: 748,775

[22] Filed: Aug. 22, 1991

[51] Int. Cl.⁵ .............................................. B01D 27/08
[52] U.S. Cl. ...................................... 210/94; 210/307; 210/313; 210/438; 210/440
[58] Field of Search .......................... 210/94, 307–309, 210/312–314, 316, 299, 438, 440, 444

[56] References Cited

U.S. PATENT DOCUMENTS

| | | | |
|---|---|---|---|
| 3,105,042 | 9/1963 | Roosa | 210/94 |
| 4,619,764 | 10/1986 | Church et al. | 210/312 |
| 5,017,285 | 5/1991 | Janik et al. | 210/232 |

FOREIGN PATENT DOCUMENTS

| | | |
|---|---|---|
| 2564147 | 11/1985 | France . |
| 2621959 | 4/1989 | France . |
| 2115305 | 9/1983 | United Kingdom . |

*Primary Examiner*—Matthew O. Savage
*Attorney, Agent, or Firm*—Chilton, Alix & Van Kirk

[57] ABSTRACT

A fuel filter assembly incorporates a modular drain bowl which may be removably mounted at the lower end of the disposable filter cartridge. An anchor insert is disposed interiorly at the lower portion of the cartridge sump for anchoring a fastener to attach the drain bowl. The insert also is specially configured to form outlet passages which facilitate the flow of water from the sump to the drain bowl.

19 Claims, 2 Drawing Sheets

FUEL FILTER ASSEMBLY WITH MODULAR DRAIN BOWL

BACKGROUND OF THE INVENTION

This invention relates generally to devices for filtering and separating fluids. More particularly, the present invention relates to fuel filters for removing foreign particles and separating water from fuel and fuel supply systems of an internal combustion engine.

The absence of high standards and quality control in diesel fuel supplies dictates that an effective fuel filter be incorporated into the fuel supply system of the diesel engine. It is not uncommon for diesel fuel to have significant quantities of abrasive particles and water. The abrasive particles present the potential for permanent damage to components of the fuel injection pump. In addition, the abrasive particles can adversely effect the performance of the pump by destroying the ability of the fuel injection pump to precisely meter and deliver fuel at high pressures. The presence of water in the diesel fuel supply can cause corrosion of engine components, and during freezing conditions, can result in interruption of the fuel injection system and/or seizure of moving components.

Fuel filters commonly employ a disposable filter cartridge which is replaced at pre-established intervals of filter usage. There are a wide variety of fuel filter cartridge configurations and orientations. The replaceable cartridge is conventionally secured to the base and/or locked to the base by a locking mechanism which is releasable to allow for removal of the cartridge for replacement purposes.

In U.S. Pat. No. 5,017,285, which is assigned to the assignee of the present invention, one disclosed inverted fuel filter assembly employs a base which mounts to the vehicle and a disposable filter cartridge which is suspended directly below the filter base. The cartridge has a housing constructed of a pair of cup-like sections which are joined along a roll seam. The roll seam functions as a retaining shoulder for engagement by a collar which threads to the base to retain the collar in position. The disposable cartridge preferably houses a dual stage filter. The lower portion of the housing forms a sump which collects water separated by at least one of the filter elements. A central axial opening at the bottom of the cartridge housing receives a drain cock. The drain cock threads into an insert which is pressed into the interior lower end of the cartridge housing. Water may be drained from the cartridge by opening the drain cock.

For certain applications, it is highly desirable that a drain bowl for the separated water be provided in conjunction with the fuel filter. The drain bowl functions to provide additional capacity for retaining the separated water. In addition, the drain bowl may be constructed of transparent materials which allow for ready exterior inspection of the water level so that the water may be drained from the bowl before maximum capacity is reached, and the effectiveness of the water separating properties of the fuel filter may be monitored.

The conventional employment of a drain bowl in conjunction with a fuel filter cartridge has essentially involved integrating the somewhat bulky drain bowl structure with the filter assembly or the filter cartridge. Naturally, the implementation of an effective fluid seal and the provision of mounting structure having a structural integrity sufficient to support the bowl are requisite to incorporating a drain bowl into the fuel assembly. In some applications, the filter cartridge is significantly modified so that it will directly accept or mount the drain bowl in a permanent fashion.

A problem associated with the use of drain bowls and the use of drain mechanisms for removing the separated water in general is providing a drain passage structure which will produce a sufficient rate of fluid or water flow. Because the filtering and separating functions of the fuel filter are conducted in a closed structure, in practice the draining of separated water from the cartridge housing tends to occur at a very low rate. The low drain rate can be attributed in part to the relatively small conventional drain openings, the surface tension of the separated water in the vicinity of the drain openings, and the unfavorable pressure differentials exerted on the separated water. In a number of applications which employ a drain bowl, the passage of separated water to the drain bowl is very inefficient and/or the draining of the separated water from the bowl or the cartridge is problematical.

SUMMARY OF THE INVENTION

Briefly stated, the invention in a preferred form is a modular fuel filter assembly comprising a base and a disposable cartridge which is mounted to the base and releasably secured thereto by means of a retainer element. The cartridge includes a housing which houses a dual stage or other type filtering system. When the cartridge is disposed in an inverted orientation relative to the base, the lower portion of the housing functions as a sump for collecting separated water. The lower portion of the cartridge also includes an opening for the sump. An insert is disposed at the housing interior adjacent the opening. The insert is adapted for threadably receiving either a drain cock or a fastener for mounting a modular drain bowl. The modular bowl is mountable at the lower end of the cartridge. The insert is structured so that the separated water efficiently passes from the sump at the lower portion of the cartridge to the bowl.

The drain bowl is modular in that the bowl may be dismounted from the cartridge and replaced with a drain cock to provide a conventional fuel filter cartridge configuration. For applications which require a drain bowl, the drain cock may be easily removed from the cartridge, and the bowl readily mounted to the lower end of the cartridge. In some embodiments, the removed drain cock may then be threaded into a drain passage of the drain bowl.

Preferably, the drain bowl is formed of a transparent material which allows for the level of separated water in the bowl to be readily inspected from a position exteriorly of the drain bowl. Fluid communication between the sump of the cartridge and the drain bowl is facilitated by drain apertures formed in the specially configured insert. The insert comprises a lower plug portion which is pressed into the central axial protruding end of the cartridge housing and an elevated platform disposed above the plug portion. The platform has the central threaded opening for anchoring the drain cock or the modular bowl fastener. The platform is supported by angularly spaced legs which further define the apertures. The legs and the apertures are angularly disposed about the central axis of the threaded opening. In one embodiment, there are three such apertures which essentially function to provide an aspirated passage from the cartridge.

An object of the invention is to provide a new and improved fuel filter assembly which employs a modular drain bowl.

A further object of the invention is to provide a new and improved fuel filter assembly wherein a drain bowl may be easily and efficiently mounted and/or dismounted as desired from an end of a disposable filter cartridge.

A further object of the invention is to provide a new and improved fuel filter assembly which incorporates a modular drain bowl and includes a passage structure to allow an efficient flow rate of separated water from the lower sump of the cartridge.

Other objects and advantages of the invention will become apparent from the drawings and the specification.

DETAILED DESCRIPTION OF THE PREFERRED EMBODIMENT

Figure 1:
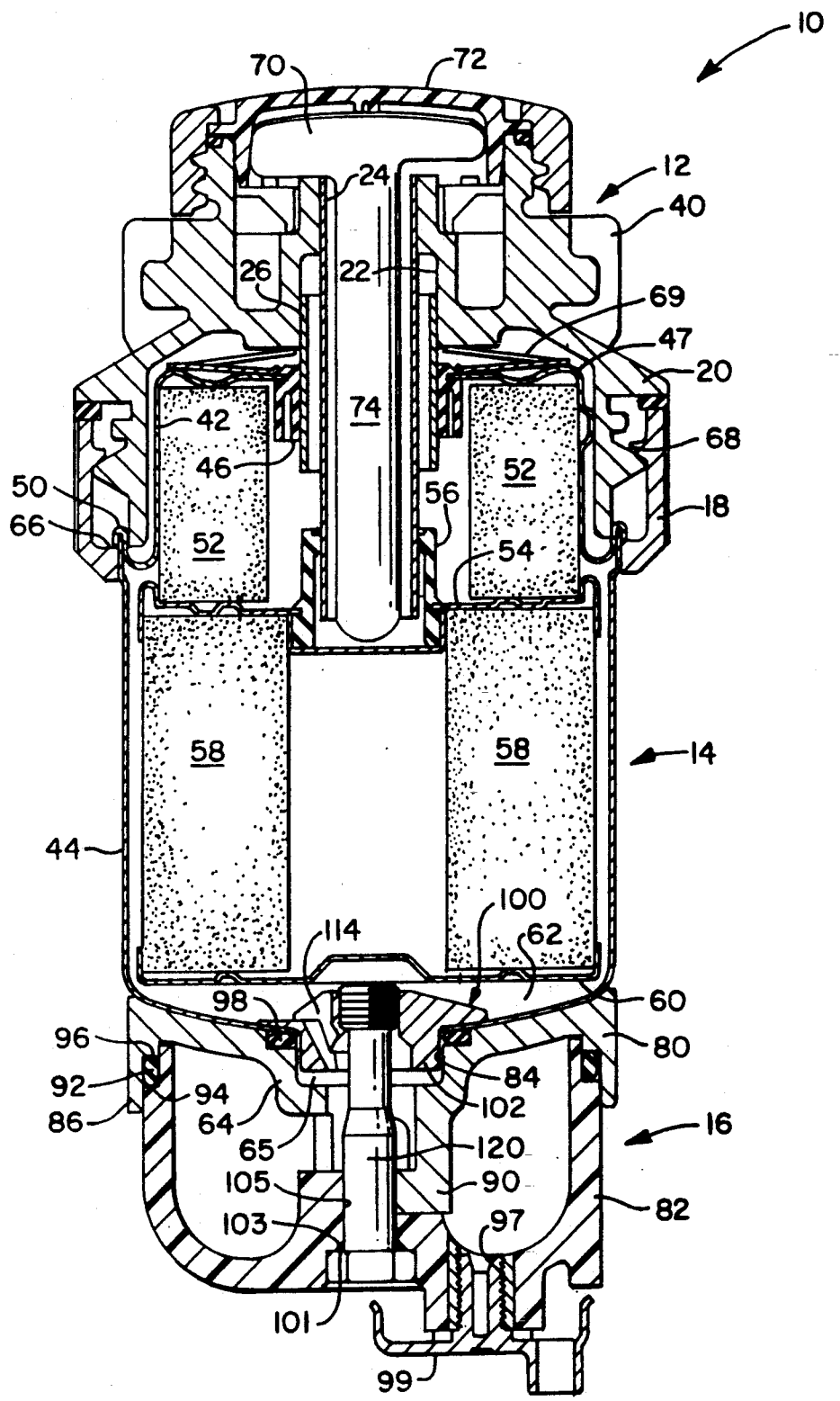
FIG. 1 is an elevational sectional view of a fuel filter assembly with a modular drain bowl in accordance with the present invention.

With reference to the drawings wherein like numerals represent like parts throughout the several FIGURES, a fuel filter assembly incorporating a modular drain bowl in accordance with the present invention is generally designated by the numeral 10. Fuel filter assembly 10 comprises a base 12, a disposable cartridge 14 and a modular drain bowl designated generally by the numeral 16. The fuel filter assembly is especially adapted for incorporation into the fuel supply system of an internal combustion engine (not illustrated), such as a diesel engine, for removing particulate matter from the fuel and for separating water from the fuel. The separated water flows to the drain bowl for retention. The separated water is then selectively drained from the drain bowl as required.

In the preferred environment, the base 12 is disposed generally above the filter cartridge 14 which is locked to the base by means of a retainer collar 18, and the drain bowl 16 is disposed below the filter cartridge. The drain bowl 16 has a modular construction which permits the drain bowl to be mounted and/or dismounted from the filter cartridge at the option of the vehicle operator, as will be detailed below. The filter cartridge 14 is specifically adapted to be fully functional with or without the associated drain bowl 16.

The base 12 and the disposable cartridge 14 may assume a wide variety of configurations. For the disclosed embodiment, the base 12 includes an inverted cup-like receptacle 20 which forms a skirt defining a lower receiving cavity for upper portions of the disposable cartridge. A central stepped axial bore 22 on the base closely receives an elongated sleeve-like conduit 24 and an outer concentric sleeve-like conduit 26. The conduits provide generally coaxial fluid communication between the base and the disposable cartridge. An inlet connector (not illustrated) located at an upper side location of the base connects with the fuel line to provide fluid communication through the passageway defined by the first conduit 24. An outlet connector (not illustrated) also located at an upper side location of the base connects with the fuel line to provide remote fluid communication from the axial fluid passageway defined between the first and second conduits 24 and 26. An integral projecting bracket 40, which may include a pair of openings for anchoring the filter base to the engine header, projects transversely at the rear of the base.

The disposable filter cartridge 14 comprises a can-like container constructed from a pair of upper and lower cup-like sections 42 and 44 which are joined along circumferential roll seam 50. The upper section 42 is dimensioned to be relatively closely received by the base receptacle 20. The upper section 42 includes a central axial opening. A sealing grommet 46 mounted at the axial opening diametrally seals against the outer conduit 26. An integral annular lip 47 projects from the top surface of the upper section 42.

In a conventional fashion, a secondary filter element 52, which has a continuous fan-shaped pleated configuration, is mounted in the upper section. The lower end of the secondary element is engaged by a multi-bent medial plate 54 which has a central recess. A second sealing grommet 56 mounted at the recess diametrally seals the first conduit 24. A primary filter element 58, which also has a continuous fan-like configuration, engages the underside of the medial plate and is retained by a lower plate 60. The primary filter element 58 is housed in the lower section 44. A sump 62 is formed at the bottom of the lower section to collect water which coalesces from the fuel. A central axial protrusion 64 of the housing includes an opening 65 which leads from the sump 62.

The disposable cartridge 14 is retained to the base 12 by means of the retainer collar 18. The collar includes an inwardly projecting annular shoulder 66 which engages the roll seam 50 of the cartridge for retentively locking the disposable cartridge to the base. The collar may threadably engage with the base or may include a pair of spiral followers 68 which interact with ramps formed at the exterior of the base. For the disclosed embodiment, a positive locked position of the retainer collar is releasably retained by the spring force of a spring washer 69 with an inscribed star-like configuration. Leaves of the spring washer angularly alternate and are alternately biased so that the one set engages the base and the other set engages at the top of the disposable cartridge. A peripheral shoulder portion of the spring is also engagable against the upper protruding lip 47 of the disposable cartridge. The spring bias provides a positive releasable locking engagement of catches of the followers to releasably lock the disposable cartridge to the base.

The disposable cartridge may also include a volume plug 70 which is retained by an endcap 72 and includes a column 74 which extends axially in the first conduit. The plug 70 functions to occupy a pre-established volume of the cartridge when the cartridge is mounted to the base so that upon dismounting of the cartridge for replacement, excess fuel which drains under the force of gravitation from the base will be retained in the cartridge and occupy the free volume gained by dismounting the cartridge.

The modular drain bowl 16 is formed by a pair of cooperative members 80 and 82 which mate to form a watertight enclosure. The upper cover member 80 has an upper surface with a concave contour which closely mirrors the exterior surface of the lower end of the cartridge. The upper member includes a central axial recess 84 which receives the axial protrusion 64 of the sump opening of the cartridge. A radially peripheral portion of the upper member forms a cylindrical skirt having a flange 86 which inwardly closely receives an upper end of the lower member. The lower bowl member forms a quasi-annular bowl which is centrally defined by a central slotted axial column 90 formed by cooperative integral structures of the members 80 and 82. A radially compressible seal ring 92 is disposed between opposed shoulders 94 and 96 of the respectively lower and upper members adjacent the skirt flange 86 for fluidly sealing the upper member with the lower member. A second seal ring 98 seals the upper member in fluid tight relationship against the outer surface of the cartridge along a sealing interface which surrounds the axial protrusion 64 of the cartridge housing. A third seal ring 101 is provided for fluidly sealing at the tapered outer recessed shoulder 103 of central bore 105 passing through member 82. Preferably, the lower member 82 and optionally upper member 80 are formed of transparent materials, such as plastic, which allow for any water which is collected in the formed bowl to be readily visible for inspection from an exterior position.

A lower off-center portion of the bowl member 82 has a threaded opening 97. A drain cock 99 is threaded to the opening to provide a valved drain passage so that collected water may be drained from the bowl as required. The drain cock 99 may have a conventional form and function such as a drain cock which is conventionally mounted to a filter cartridge for draining the cartridge sump 62.

Figure 2:
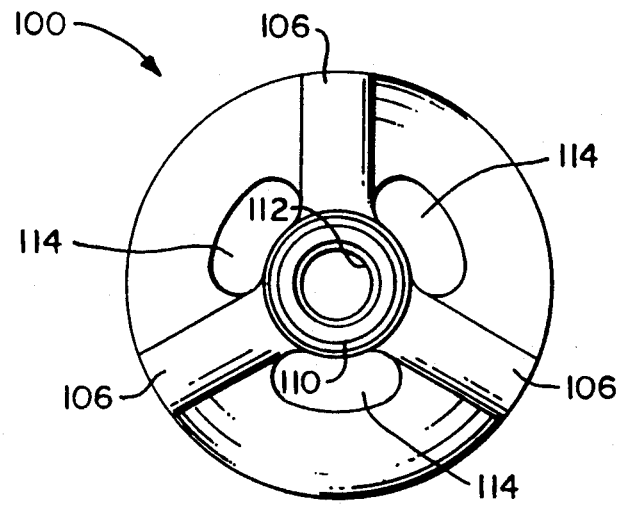
FIG. 2 is an enlarged top plan view of an insert member employed in the fuel filter assembly of FIG. 1.
Figure 3:
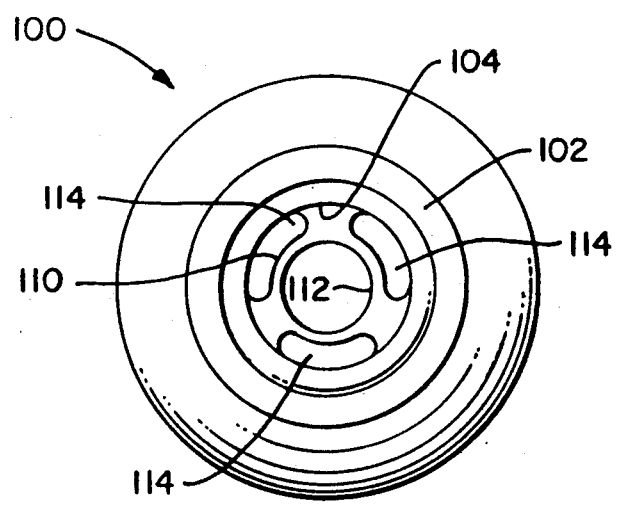
FIG. 3 is a bottom plan view of the insert member of FIG. 2.

With additional reference to FIGS. 2 and 3, the modular bowl 16 is fastened to the cartridge through an insert 100 which is disposed interiorly at the lower end of the cartridge housing adjacent the sump opening. The insert 100 includes a contoured lower plug 102 having a lower reduced diameter and an upper enlarged diameter. The lower plug portion is exteriorly contoured for press fitting in the protrusion 64 at the lower interior of the cartridge housing. The plug has an opening 104 which communicates with the sump opening 65. Three equiangularly spaced legs 106 integrally extend from the plug at an oblique angle and integrally connect with a platform 110. The platform has a central axial opening which is defined by a threaded surface 112. Three angularly spaced apertures 114 are thus defined by the legs to provide communication through the plug opening 104 and the cartridge opening 65.

A head-head bolt 120 is inserted through the axial cavity of the bowl members formed by the slotted column 90. The head of the bolt engages the recessed shoulder 103 in the lower member. The shank of the bolt threads into the threaded surface 112 of the platform for fastening the modular bowl to the cartridge. The bolt is tightened to axially load the seal rings 98 and 101 so that in conjuction with seal 92, the upper and lower members cooperate to seal the bowl in fluid tight relationship with the cartridge.

The apertures 114 defined by the insert function as an aspirated opening to facilitate the efficient passage of water collected in the cartridge sump. In addition, the insert 100 can be employed for threadably receiving the drain cock 99 when the modular drain bowl is not desired. An insert or molded member (not illustrated) similar to insert 100 may also be located at the drain bowl opening for mounting the drain cock.

The filter assembly is modular in that the drain bowl may optionally be dismounted by unthreading the bolt from the insert 100 and remounting the drain cock 99 at the cartridge opening by threadably engaging the drain cock into the insert. The insert in the latter configuration functions to provide an aspirated opening for fluid passage through the drain cock.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A modular fuel filter assembly comprising:
   base means comprising receptacle means, inlet and outlet means and fluid passage means communicating with said inlet and outlet means;
   cartridge means comprising filter means and housing means for housing said filter means, said housing means being receivable by said receptacle means, said housing means having an axis and opposed first and second end portions spaced axially along said axis, said first end portion having first opening means defining an axial opening extending axially along said axis for receiving said fluid passage means, said second end portion defining a sump interiorly of said housing means and comprising second opening means for defining a second opening for said sump, anchoring means mounted interiorly of said housing means adjacent said second end portion at a central position thereof for anchoring a fastener;
   retaining means for releasably securing said cartridge means to said base means;
   bowl means for forming a covered bowl for retaining fluid, said bowl means being mountable to said cartridge means exteriorly of said housing means adjacent said second end portion, said bowl means comprising a bowl member and a cover member which substantially covers said bowl member to form said covered bowl, said cover member having a surface which is generally complementary to the exterior surface of said second end portion, and said bowl means comprising communication means to provide fluid communication between an interior of said bowl and said second opening; and fastener means comprising a fastener engageable with said bowl member and said anchor means for releasably fastening said bowl means to said cartridge means.

2. The modular fuel filter assembly of claim 1 wherein said anchoring means comprises a threaded surface defining a third axial opening generally axially aligned with said second opening and said fastener means comprises a threaded surface complementary with the threaded surface of said anchoring means.

3. The modular fuel filter assembly of claim 2 wherein said anchoring means further comprises insert means comprising a plug press-fitted against said second end portion and a platform spaced axially along said axis from said plug and defining said third opening, said insert means comprising passage means for forming a passage extending between said sump and said second opening.

4. The modular fuel filter assembly of claim 3 said insert means further defines three angularly spaced apertures generally symmetrically disposed relative to said second opening.

5. The modular fuel filter assembly of claim 1 wherein said fastener comprises a bolt and said bowl means comprises cavity means for defining a central axial cavity extending axially along said axis and shoulder means adjacent said cavity, said bolt being inserted through said cavity and engageable against said shoulder means.

6. The modular fuel filter assembly of claim 1 wherein said cover member has a generally concave surface which is generally complementary to the exterior surface of said second end portion.

7. The modular fuel filter assembly of claim 1 wherein said bowl means further defines a drain passage and further comprising valve means disposed in said passage for selectively opening and closing said drain passage.

8. The modular fuel filter of claim 1 further comprising seal means engageable between said cartridge means and said cover member and axially loadable for providing a fluid tight seal between said cartridge means and said cover member.

9. The modular fuel filter assembly of claim 1 wherein at least a portion of said bowl means is constructed from transparent material.

10. A modular assembly for mounting to a fuel filter base comprising:
cartridge means comprising filter means and housing means for housing said filter means, said housing means having an axis and a generally cylindrical shape and an end panel having an interior surface facing said filter means and an exterior surface and defining an axial opening extending axially along said axis;
insert means disposed adjacent to said axial opening, said insert means engaging said interior surface and comprising a threaded surface extending axially along said axis interiorly of said housing means, said insert means further defining at least one aperture which communicates between the housing means interior and said axial opening;
drain bowl means having an upper surface which engages said exterior surface in generally surface-to-surface relationship for forming a fluid-tight enclosure in fluid communication with said axial opening, said drain bowl means defining a central axis cavity extending axially along said axis and a shoulder; and
fastener means for releasably securing said drain bowl means to said cartridge means by threadable engagement with said threaded surface, said fastener means comprising a bolt engageable against said shoulder and extending through said cavity.

11. The modular assembly of claim 10 wherein said insert means further comprises a plug portion engaging said interior surface and a spaced platform which defines said threaded surface.

12. The modular assembly of claim 11 wherein a plurality of angularly spaced legs integrally connect said plug portion and said platform and at least partially define a plurality of apertures.

13. The modular assembly of claim 10 wherein said drain bowl means comprises a cover member and a bowl member which cooperate to form said bowl and are axially forced together when said fastener means engages said threaded surface.

14. The modular assembly of claim 10 wherein said drain bowl means further comprises an outlet passage and a valve disposed in said passage.

15. The modular assembly of claim 10 wherein said exterior surface is convex and includes a central axially protruding portion surrounding said axial opening.

16. A modular assembly for mounting to a fuel filter base comprising:
cartridge means comprising filter means and housing means for housing said filter means, said housing means having an axis and a generally cylindrical shape and an end panel having an interior surface facing said filter means and an exterior surface and defining an axial opening extending axially along said axis;
insert means disposed adjacent to said axial opening, said insert means comprising a plug portion engaging said interior surface and a platform axially spaced along said axis from said plug portion, said platform defining a threaded surface extending axially along said axis, a plurality of angularly spaced legs integrally connecting said plug portion and said platform and at least partially defining a plurality of apertures which communicate between the housing means interior and said axial opening;
drain bowl means having an upper surface which engages said exterior surface in generally surface-to-surface relationship for forming a fluid-tight enclosure in fluid communication with said axial opening; and
fastener means for releasably securing said drain bowl means to said cartridge means by threadable engagement with said threaded surface.

17. A modular assembly for mounting to a fuel filter base comprising:
cartridge means comprising filter means and housing means for housing said filter means, said housing means having an axis and a generally cylindrical shape and an end panel having an interior surface facing said filter means and an exterior surface and defining an axial opening extending axially along said axis;
insert means disposed adjacent to said axial opening, said insert means engaging said interior surface and comprising a threaded surface extending axially along said axis interiorly of said housing means, said insert means further defining at least one aperture which communicates between the housing means interior and said axial opening;
drain bowl means having an upper surface which engages said exterior surface in generally surface-to-surface relationship for forming a fluid-tight enclosure in fluid communication with said axial opening, said drain bowl means comprising a cover member and a bowl member which cooperate to form said bowl; and
fastener means for releasably securing said drain bowl means to said cartridge means by threadable engagement with the said threaded surface wherein said drain bowl sections are axially forced together by said fastener means.

18. A modular assembly for mounting to a fuel filter base comprising:
cartridge means comprising filter means and housing means for housing said filter means, said housing means having an axis and a generally cylindrical shape and an end panel having an interior surface facing said filter means and an exterior surface and defining an axial opening extending axially along said axis;

insert means disposed adjacent to said axial opening, said insert means engaging said interior surface and comprising a threaded surface extending axially along said axis interiorly of said housing means, said insert means further defining at least one aperture which communicates between the housing means interior and said axial opening;

drain bowl means comprising a cover having an upper surface which engages said exterior surface in generally surface-to-surface relationship for forming a fluid tight enclosure in fluid communication with said axial opening; and fastener means for releasably securing said drain bowl means to said cartridge means by a threadable engagement with said threaded surface.

19. The modular assembly of claim 18 wherein said bowl means defines a central axial cavity and a shoulder, and said fastener means comprises a bolt engageable against said shoulder and extending through said cavity.

* * * * *